United States Patent [19]

Fennel et al.

[11] Patent Number: 5,210,692
[45] Date of Patent: May 11, 1993

[54] PROCESS AND CIRCUIT CONFIGURATION FOR ANALYZING THE WHEEL SPEED SIGNALS FOR USE WITH AN ANTI-LOCKING OR TRACTION SLIP CONTROL

[75] Inventors: Helmut Fennel, Bad Soden; Michael Latarnik, Friedrichsdorf, both of Fed. Rep. of Germany

[73] Assignee: Alfred Teves GmbH, Frankfurt am Main, Fed. Rep. of Germany

[21] Appl. No.: 518,910

[22] Filed: May 4, 1990

[30] Foreign Application Priority Data

May 16, 1989 [DE] Fed. Rep. of Germany ....... 3915879

[51] Int. Cl.⁵ ............................................. B60T 8/58
[52] U.S. Cl. .............................. 364/426.02; 364/565; 303/96; 303/109
[58] Field of Search ........................... 364/426.02, 565; 303/95, 109, 96; 180/197; 324/160, 166

[56] References Cited

U.S. PATENT DOCUMENTS

| | | | |
|---|---|---|---|
| 4,517,647 | 5/1985 | Harada et al. | 364/426.02 |
| 4,675,819 | 6/1987 | Fennel | 364/426.02 |
| 4,818,037 | 4/1989 | McEnnan | 364/426.02 |
| 4,877,295 | 10/1989 | Yoshino | 364/426.02 |
| 4,883,325 | 11/1989 | Shimanuki et al. | 364/426.02 |
| 4,929,035 | 5/1990 | Shimanuki | 364/426.02 |
| 4,969,100 | 11/1990 | Takata et al. | 364/426.02 |
| 4,991,910 | 2/1991 | Shimanuki et al. | 364/426.02 |
| 5,065,327 | 11/1991 | Yahagi et al. | 364/426.02 |

FOREIGN PATENT DOCUMENTS

| | | |
|---|---|---|
| 2212618 | 9/1973 | European Pat. Off. . |
| 0133381 | 7/1984 | European Pat. Off. . |
| 8904783 | 6/1989 | European Pat. Off. . |
| 2151320A | 11/1984 | United Kingdom . |

Primary Examiner—Gary Chin
Attorney, Agent, or Firm—Robert P. Seitter; J. Gordon Lewis

[57] ABSTRACT

For evaluating the wheel speed signals (V(n)) required by an anti-locking or traction slip control system, a basic speed (VBas(n)) is derived from the speed signals of the individual wheels, and a wheel factor (Ki(n)) is formed for each wheel which, when multiplied by the wheel speed, forms the basic speed. For further signal processing, the wheel speed multiplied by the appertaining wheel factor is used in lieu of the actual wheel speed to form the reference speed, and the control signals.

14 Claims, 2 Drawing Sheets

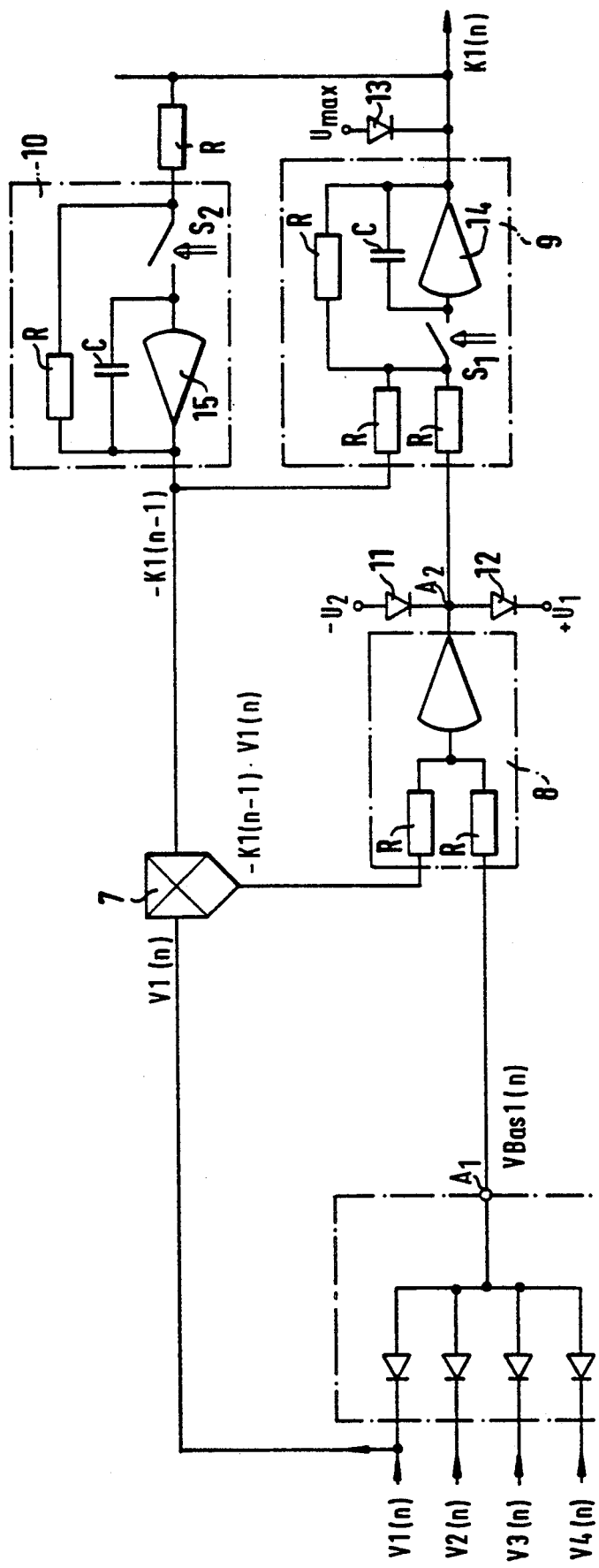
FIG. 2
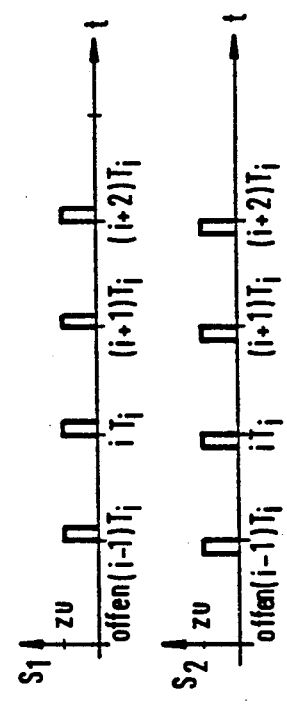

PROCESS AND CIRCUIT CONFIGURATION FOR ANALYZING THE WHEEL SPEED SIGNALS FOR USE WITH AN ANTI-LOCKING OR TRACTION SLIP CONTROL

BACKGROUND OF THE INVENTION

The present invention relates to a process for analyzing the wheel speed signals for use with automotive vehicles provided with an anti-locking and/or traction slip control system. In these systems brake pressure and/or engine control signals are generated through logical combination and processing of the wheel speed signals. A circuit configuration for carrying out the process also is provided.

Known anti-locking and traction slip control systems require information on the rotating pattern of the individual wheels. Through logical combination of the individual wheel signals and evaluation according to predetermined criteria, the vehicle speed, the road condition and the frictional coefficient for both driving straight forward or around a bend are derived from the wheel speeds. Normally, a vehicle reference speed is determined from the wheel speeds, which determines the brake pressure modulation during a control operation. Measuring the vehicle reference speed directly, for example, by optical methods requires substantial effort and is less reliable. A precise measurement of the individual wheel speeds is, therefore, of high importance. In some situations, only two wheels, such as the non-driven wheels, are available as an information source for the slip control.

In determining and evaluating the wheel speeds, normally the wheel diameter is assumed to be a constant and identical for all wheels, although substantial differences may occur in practice. Such deviations become manifest, for example, once a spare wheel is mounted, the circumference of which may be smaller by 25 percent than the standard wheel. In unfavorable cases, this results in substantial deviations from an optimum control, resulting, for example in an extended stopping distance.

It is, therefore, an object of the present invention to overcome these and other disadvantages and to provide a process which also in cases of varying wheel sizes permits a precise evaluation of the wheel speed signals.

SUMMARY OF THE INVENTION

It has been found that this problem is solved by a process of the present invention, a particular feature of which resides in that a basic speed is derived from the speed signals of the individual wheels and/or wheel groups such as rear wheels. Further, for each wheel and wheel group, respectively, a wheel factor is formed which, when multiplied by the wheel speed, results in the basic speed, and wherein the continued signal processing, in particular, the formation of the vehicle reference speed and of the control signals, is based on the wheel speed multiplied by the appertaining wheel factor, rather than on the actual wheel speed. The respective wheel factor, according to an advantageous embodiment of the present invention, is formed by a process in which the changes in each computing cycle over the preceding cycle are detected and evaluated for adjustment of the wheel factor.

In the practice of the present invention, a wheel factor is associated with each wheel, the quality of which, is determined in a process and is continually adjusted, thereby balancing the influence of varying wheel radii. The wheel speeds as measured are quasi "standardized" or "calibrated". In further processing the speed signals, to compute the vehicle reference speed, the brake pressure control signals adjusted values are assumed, thereby eliminating the influence of wheel diameter variations.

According to another embodiment of the process, in accordance with the invention, the wheel factors are formed according to the following formula:

$$Ki(n) = Ki(n-1) + fi(DV(n), V(n), K(n-1), n),$$

wherein $$V(n) = \begin{bmatrix} V1(n) \\ V2(n) \\ V3(n) \\ V4(n) \end{bmatrix} \quad K(n) = \begin{bmatrix} K1(n) \\ K2(n) \\ K3(n) \\ K4(n) \end{bmatrix}$$

$$DV(n) = \begin{bmatrix} VBas1(n) - K1(n-1)^* V1(n) \\ VBas2(n) - K2(n-1)^* V2(n) \\ VBas3(n) - K3(n-1)^* V3(n) \\ VBas4(n) - K4(n-1)^* V4(n) \end{bmatrix}$$

$$VBas(n) = \begin{bmatrix} VBas1(n) \\ VBas2(n) \\ VBas3(n) \\ VBas4(n) \end{bmatrix} = \begin{bmatrix} F1(V(n), V(n-1), \ldots, V(0)) \\ F2(V(n), V(n-1), \ldots, V(0)) \\ F3(V(n), V(n-1), \ldots, V(0)) \\ F4(V(n), V(n-1), \ldots, V(0)) \end{bmatrix}$$

$i$ = wheel 1, 2, 3, 4,
$n$ = integer $(t/Tj)$;
$t$ = time;
$Tj$ = time between two scanning operations (clock time);
and $Ki(n) - Ki(n-1)$ has the same sign as
$VBasi(n) - Ki(n-1)^*Vi(n)$.

In some cases, the instantaneous lowest wheel speed may be the basic speed. This process can be employed only externally. During a control operation, in that instance, the signal processing is based, in unchanged form, on the wheel factors available upon commencement of the control.

The present invention also can be used for the identification of bends. For that purpose, a short-term wheel factor, that is a wheel factor mirroring the instantaneous rotating pattern and which is adjusted at short intervals, e.g., in the working cycle of the signal processing, and a long-term wheel factor adjusted at a relatively large time constant to the variations are determined for each of the wheels. This forms the difference between the short-term and the long-term wheel factor and is evaluated for the identification of bends.

A circuit configuration for carrying out the process of the present invention includes a selective circuit to which the wheel speed signals are provided, and which forms the basic speed. A multiplier stage multiplies the actual wheel speed by the appertaining wheel factor taken from a memory and determined in a preceding (preferably in the last) cycle and feeds the product to a difference former forming the difference between the product and the basic speed. Moreover, a computer is provided computing the actual wheel factor from the stored wheel factor and from the output signal of the difference former. The actual wheel speed also can be provided to the computer on an input in the computation of the actual wheel factor. For example, by providing the actual wheel speed, during standstill of the vehicle or at speeds below predetermined thresholds, elimination of the adjustment of the wheel factors thereby may be attained.

BRIEF DESCRIPTION OF THE DRAWINGS

Additional features, advantages and applications of the present invention will become apparent from the following detailed description of embodiments of the present invention with reference to the enclosed drawing, wherein.

DETAILED DESCRIPTION

Figure 1:
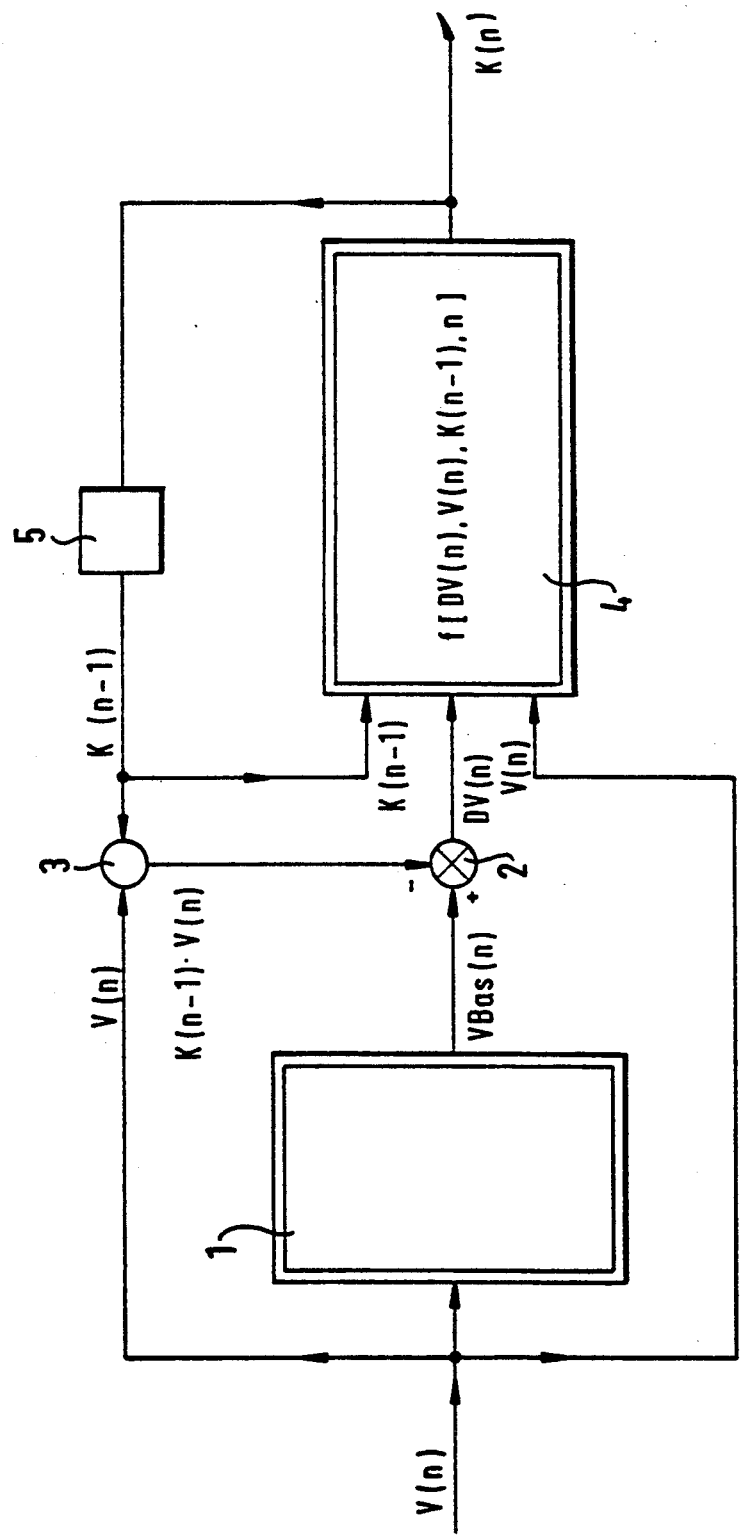
FIG. 1 is a block diagram showing the essential stages of a control circuit for carrying into effect the process of the invention; and, FIG. 2 shows an electrical circuit configuration of the type corresponding to the control circuit according to FIG. 1.

According to FIG. 1 of the drawing, the wheel speeds V(n) of the four vehicle wheels are supplied to a selective circuit 1 generating the basic speed VBas(n). In a preferred embodiment of the present invention, the instantaneous minimum vehicle speed is selected to be the common speed. The output signal VBas(n) is provided to a difference former 2 comparing the same to the product of a multiplier stage 3 and providing the difference DV(n) to a computer 4.

In the multiplier stage 3, the product is formed of the actual vehicle speed V(n) and the wheel factor $K(n-1)$ taken from the memory 5, that is, the wheel factor determined in the preceding cycle. Also, a previous cycle, e.g., $n-2$ can be stored and processed, if this be more preferable.

The differential signal DV(n), the wheel factor $K(n-1)$ and the actual wheel speed V(n) are fed to the computer 4 thereby being available for computing the actual wheel factor K(n). The computation is according to the following formula:

$$Ki(n) = Ki(n-1) + fi\ (DV(n),\ V(n),\ K(n-1),n),$$

wherein $$V(n) = \begin{bmatrix} V1\ (n) \\ V2\ (n) \\ V3\ (n) \\ V4\ (n) \end{bmatrix} \quad K(n) = \begin{bmatrix} K1\ (n) \\ K2\ (n) \\ K3\ (n) \\ K4\ (n) \end{bmatrix};$$

$$DV(n) = \begin{bmatrix} VBas1(n) - K1(n-1)^* V1(n) \\ VBas2(n) - K2(n-1)^* V2(n) \\ VBas3(n) - K3(n-1)^* V3(n) \\ VBas4(n) - K4(n-1)^* V4(n) \end{bmatrix} ; \text{ and wherein}$$

$n$ = (is an) integer

According to FIG. 2 of the drawing, a circuit corresponding to the control circuit of FIG. 1, comprises a diode field 6 through which the individual wheel speeds V1(n) to V4(n) are supplied. The minimum speed Min Vi(n) determines the output level of the diode field 6, which provides, in that instance, the basic speed VBas(n). The voltage on output $A_1$ is expressed by the following formula: VBas1(n)=Min V1(n), V2(n), V3(n), V4(n). Again, this signal is compared to the product formed in a multiplier stage 7. FIG. 2 illustrates the circuit for evaluating the wheel speed signal V1(n) of a predetermined wheels. Corresponding circuits (not shown) are provided for the balance of the wheels. The wheel speed signal of wheel "1", that is, the wheel speed signal V1(n), in the multiplier stage 7, is multiplied by the corresponding wheel factor $K1(n-1)$ of the preceding computing cycle, $n-1$. The difference between this product and the basic speed VBas1(n) is formed in a comparator or in a difference former 8. In a subsequent computing cycle 9, K1(n) again is determined. This value K1(n), in the following cycle, through a memory circuit 10, is then returned as $K1(n-1)$ to the multiplier phase 7 and to the input of the circuit 9.

The major elements of circuits 9 and 10 are operating boosters 14, 15, RC-members and switches $S_1$ and $S_2$ actuated in the timing cycle. The interval between two scanning operations is Tj; the switching position of the two switches $S_1$, $S_2$ versus time is shown in FIG. 2. With switches $S_1$ or $S_2$ opened, the output potential of the circuits is maintained by capacitor C, whereas after closing of switch $S_1$ and $S_2$, respectively, the capacitor is charged or discharged through the illustrated resistors and through the operating booster 14 and 15, respectively. This operation follows the known "sample-/hold principle". Additionally, diodes 11, 12, 13 are provided in the circuit according to FIG. 2, for voltage limitation. The potential on output $A_2$ only can assume the values $+U_1$ or $-U_2$. The predetermined level of the potentials $+U_1$ and $-U_2$, respectively, determines the change in the wheel factor Ki(n) per cycle, thereby influencing the dynamics of the learning process and the trouble susceptibility of the circuit.

The circuit according to FIG. 2, as opposed to the control circuit according to FIG. 1, is not provided with a direct communication between input V1(n) and circuit 9. For clarity, this additional signal path has not been illustrated.

What is claimed is:

1. A system for modifying wheel speed signal of an automotive vehicle, said system comprising:
   means for supplying a plurality of wheel speed signals representative of the rotational behavior of the wheels of an automotive vehicle;
   means responsive to said wheel speed signals for generating a basic speed signal representative of a basic speed of said vehicle;
   means for repetitively developing successive correction signals in successive cycles to correct said wheel speed signal including:
   (a) means for storing a previously developed correction signal,
   (b) means for developing a product signal representative of the product of said wheel speed signals and said previously developed and stored correction signal,
   (c) means for developing a difference signal representative of the difference between said basic speed signal and said product signal, and
   (d) means responsive to:
   (1) said wheel speed signals,
   (2) said difference signal, and
   (3) said previously developed and stored correction signal
   for developing said successive correction signals; and
   means, responsive to the product of said successive correction signals and said wheel speed signals, for generating a vehicle reference speed for controlling brake pressure.

2. A system in accordance with claim 1 wherein said successive correction signals are represented by a corresponding wheel factor (Ki), which is derived from the following:

$$Ki(n) = Ki(n-1) + fi\ (DV(n),\ V(n),\ K(n-1), n),$$

wherein $$V(n) = \begin{matrix} V1\ (n) \\ V2\ (n) \\ V3\ (n) \\ V4\ (n) \end{matrix} \quad K(n) = \begin{matrix} K1\ (n) \\ K2\ (n) \\ K3\ (n) \\ K4\ (n) \end{matrix}$$

$$DV(n) = \begin{matrix} VBas1(n) - K1(n-1)^* V1(n) \\ VBas2(n) - K2(n-1)^* V2(n) \\ VBas3(n) - K3(n-1)^* V3(n) \\ VBas4(n) - K4(n-1)^* V4(n) \end{matrix}$$

$$VBas(n) = \begin{matrix} VBas1(n) \\ VBas2(n) \\ VBas3(n) \\ VBas4(n) \end{matrix} = \begin{matrix} F1(\ V(n), V(n-1), \ldots, V(0)) \\ F2(\ V(n), V(n-1), \ldots, V(0)) \\ F3(\ V(n), V(n-1), \ldots, V(0)) \\ F4(\ V(n), V(n-1), \ldots, V(0)) \end{matrix}$$

$i$ = wheel 1, 2, 3, 4,
$n$ = integer $(t/Tj)$;
$t$ = time;
$Tj$ = time between two scanning operations (clock time);
and $Ki(n) - Ki(n-1)$ has the same sign as
$VBasi(n) - Ki(n-1)^* Vi(n)$.

3. A system in accordance with claim 2 wherein said means for generating a basic speed signal means for selecting one of said wheel speed signals to generate said basic speed signal.

4. A system in accordance with claim 3 wherein said means for selecting one of said wheel speed signal to generate said basic speed signal includes means for selecting the wheel speed signal representative of the lowest wheel speed as said basic speed signal.

5. A system in accordance with claim 2 wherein said previously developed and stored correction signal is developed from the immediately preceding cycle.

6. A system in accordance with claim 2 further comprising:
means for limiting the change in value of the difference signal of said successive cycles; and
means for limiting the change in value of the correction signals of said successive cycles.

7. A process for modifying wheel speed signals of an automotive vehicle, said process comprising the steps of:
supplying a plurality of wheel speed signals representative of the rotational behavior of the wheels of said automotive vehicle;
generating a basic speed signal representative of a basic speed of said vehicle in response to said wheel speed signals;
repetitively developing successive correction signals in successive cycles to correct said wheel speed signals, by:
(a) storing a previously developed correction signal,
(b) developing a product signal representative of the product of said wheel speed signals and said previously developed and stored correction signal,
(c) developing a difference signal representative of the difference between said basic speed signal and said product signal, and
(d) developing said successive correction signals in response to said wheel speed signals, and said previously developed and stored correction signal; and
generating, in response to the product of said successive correction signals and said wheel speed signal, a vehicle reference speed for controlling brake pressure.

8. A process in accordance with claim 7 wherein said successive correction signals are represented by a corresponding wheel factor (Ki), and the process further comprises the step of deriving said wheel factor from the following:

$$Ki(n) = Ki(n-1) + fi\ (DV(n),\ V(n),\ K(n-1), n),$$

wherein $$V(n) = \begin{matrix} V1\ (n) \\ V2\ (n) \\ V3\ (n) \\ V4\ (n) \end{matrix} \quad K(n) = \begin{matrix} K1\ (n) \\ K2\ (n) \\ K3\ (n) \\ K4\ (n) \end{matrix}$$

$$DV(n) = \begin{matrix} VBas1(n) - K1(n-1)^* V1(n) \\ VBas2(n) - K2(n-1)^* V2(n) \\ VBas3(n) - K3(n-1)^* V3(n) \\ VBas4(n) - K4(n-1)^* V4(n) \end{matrix}$$

$$VBas(n) = \begin{matrix} VBas1(n) \\ VBas2(n) \\ VBas3(n) \\ VBas4(n) \end{matrix} = \begin{matrix} F1(\ V(n), V(n-1), \ldots, V(0)) \\ F2(\ V(n), V(n-1), \ldots, V(0)) \\ F3(\ V(n), V(n-1), \ldots, V(0)) \\ F4(\ V(n), V(n-1), \ldots, V(0)) \end{matrix}$$

$i$ = wheel 1, 2, 3, 4,
$n$ = integer $(t/Tj)$;
$t$ = time;
$Tj$ = time between two scanning operations (clock time);
and $Ki(n) - Ki(n-1)$ has the same sign as
$VBasi(n) - Ki(n-1)^* Vi(n)$.

9. A process in accordance with claim 8 wherein said previously developed and stored correction signal is developed from the immediately preceding cycle.

10. A process in accordance with claim 8 further comprising:
limiting the change in value of the difference signals of said successive cycles;
limiting the change in value of the correction signals of said successive cycles.

11. A process in accordance with claim 8 wherein the step of generating a basic speed signal includes selecting one of said wheel speed signals to generate said basic speed signal.

12. A process in accordance with claim 11 wherein the step of selecting one of said wheel speed signals to generate said basic speed signal includes selecting the wheel speed signal representative of the lowest wheel speed as said basic speed signal.

13. A system for modifying wheel speed signals of an automotive vehicle, said system comprising:
means for supplying a plurality of wheel speed signals representative of the rotational behavior of the wheels of said automotive vehicle;
means responsive to said wheel speed signals for generating a basic speed signal representative of a basic speed of said vehicle;

means for repetitively developing successive correction signals in successive cycles to correct said wheel speed signals including:
  (a) means for storing a previously developed correction signal,
  (b) means for developing a product signal representative of the product of said wheel speed signals and said previously developed and stored correction signal,
  (c) means for developing a difference signal representative of the difference between said basic speed signal and said product signal, and
  (d) means responsive to:
    (1) said wheel speed signals,
    (2) said difference signal, and
    (3) said previously developed and stored correction signal
  for developing said successive correction signals;
means for limiting the change in value of the difference signals of said successive cycles; and
means for limiting the change in value of the correction signals of said successive cycles.

14. A process for modifying wheel speed signals of an automotive vehicle, said process comprising the steps of:

supplying a plurality of wheel speed signals representative of the rotational behavior of the wheels of said automotive vehicle;
generating a basic speed signal representative of a basic speed of said vehicle in response to said wheel speed signals;
repetitively developing successive correction signals in successive cycles to correct said wheel speed signals, by:
  (a) storing a previously developed correction signal,
  (b) developing a product signal representative of the product of said wheel speed signals and said previously developed and stored correction signal,
  (c) developing a difference signal representative of the difference between said basic speed signal and said product signal, and
  (d) developing said successive correction signals in response to said wheel speed signals, said difference signal, and said previously developed and stored correction signal;
limiting the change in value of the difference signals of said successive cycles; and
limiting the change in value of the correction signals of said successive cycles.

* * * * *

UNITED STATES PATENT AND TRADEMARK OFFICE
CERTIFICATE OF CORRECTION

PATENT NO. : 5,210,692

DATED : May 11, 1993

INVENTOR(S) : Fennel et al.

It is certified that error appears in the above-indentified patent and that said Letters Patent is hereby corrected as shown below:

Claim 1, Col. 4, line 40, delete "signal" and insert therefor --signals--.

Claim 1, Col. 4, line 50, delete "signal" and insert therefor --signals--.

Claim 3, Col. 5, line 34, after "signal" insert --include--.

Claim 4, Col. 5, line 38, delete "signal" and insert therefor --signals--.

Claim 6, Col. 5, line 48, delete "signal" and insert therefor --signals--.

Claim 7, Col. 6, line 5, before "and" insert --said difference signal--.

Claim 7, Col. 6, line 9, after "speed" delete "signal" and insert therefor --signals--.

Claim 10, Col. 6, line 49, after "cycles;" insert --and--.

Signed and Sealed this

Eighth Day of February, 1994

Attest:

BRUCE LEHMAN

*Attesting Officer*  *Commissioner of Patents and Trademarks*